INVENTOR.
H. M. RICHARDSON
BY Hudson & Young
ATTORNEYS

July 10, 1956   H. M. RICHARDSON   2,754,169
INTERVAL TIMER AND METHOD OF MEASURING TIME INTERVALS
Filed Feb. 12, 1953   2 Sheets-Sheet 2

INVENTOR.
H. M. RICHARDSON
BY *Hudson & Young*
ATTORNEYS

United States Patent Office 2,754,169
Patented July 10, 1956

2,754,169

INTERVAL TIMER AND METHOD OF MEASURING TIME INTERVALS

Harold M. Richardson, Albuquerque, N. Mex., assignor to Phillips Petroleum Company, a corporation of Delaware Application February 12, 1953, Serial No. 336,480

11 Claims. (Cl. 346—44)

This invention relates to the measurement of time intervals. In one of its more specific aspects, this invention relates to a time interval measuring device. In another specific aspect, this invention relates to a method of measuring time intervals. In another specific aspect, the invention pertains to a device and method of determining accurately and rapidly short time intervals.

This invention is applicable to any situation where it is desired to measure small time intervals between the occurrence of two events. One of its applications is in the measurement of the rate of detonation of explosives. Another of its applications is in the measurement of ignition delay of fuels. The invention is also applicable in measuring the speed of bodies passing two points, such as bullets or projectiles, automobiles, airplanes, doors or shutters, etc. It is often desirable in the laboratory to have available means for measuring short time intervals, and this invention because of its adaptability to different situations is especially applicable.

The objects of this invention will be attained by the various aspects of the invention.

The objects of the invention are several, viz:

To provide a device for accurately and rapidly measuring time intervals;

To provide a device which is especially applicable for the measurement of very short time intervals;

To provide a method for the measurement of time intervals;

To provide a device for the measurement of time intervals embodying the features of accuracy, simplicity of operation, and dependability; and To provide other advantages which will become apparent from a consideration of the accompanying disclosure.

In accordance with the present invention, a first electric pulse, indicating the beginning of the time interval to be measured, is provided in a first electrical channel. The occurrence of this first pulse is recorded simultaneously on two drums, rotating at known, constant and different rates of speed. Subsequently, a second electric pulse, indicating the end of the time interval to be measured, is provided in a second electrical channel. The occurrence of this second pulse is also simultaneously recorded on the same two drums. Knowing the speed of rotation of the drums, the time interval between the two pulses is determined by measuring the distances between the two sets of points on the drums. A scale may be used for conversion to seconds or milliseconds. By utilizing two drums rotating at different known speeds, it is possible to obtain a coarse reading from one drum and a vernier reading from the other, thus increasing the accuracy of the readings. It is also within the contemplation of this invention to employ movable scales mounted next to the drums so as to obtain direct time interval readings.

A more comprehensive understanding of the invention will be had from a consideration of the accompanying drawing attached hereto wherein.

Figure 1:
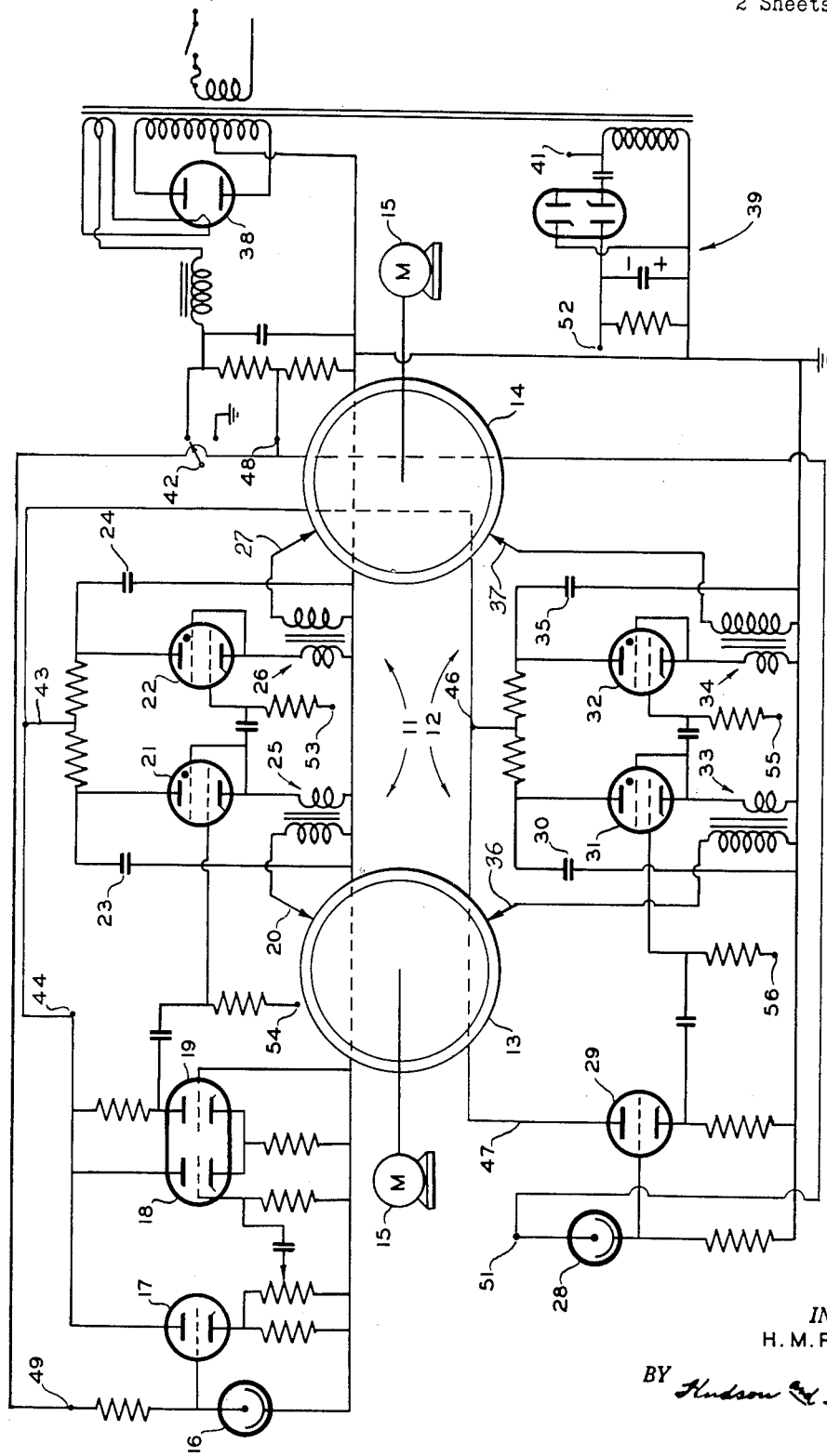
Figure 1 is a circuit diagram of one arrangement of the device according to the invention.

Referring to Figure 1 of the drawing, numerals 11 and 12 designate a first or upper electrical channel and a second or lower electrical channel, respectively. Drums 13 and 14 are covered with spark-sensitive paper and are rotated by synchronous motors 15 at known, constant and different rates of speed. In the upper channel, photocell 16 has its anode connected to the grid of vacuum tube 17 which is connected as a cathode follower having a gain control. A second vacuum tube 18 is connected as a cathode follower and feeds a third vacuum tube 19 connected as a grounded grid amplifier. As shown, tubes 18 and 19 are contained in a single envelope, but they may each be contained in individual envelopes. The output of tube 19 is applied to the grid of thyratron 21, and its output, taken from the cathode, is applied to the grid of thyratron 22. Thyratrons 21 and 22 are shunted by condensers 23 and 24, respectively, and their grids are supplied a negative bias. The primary windings of spark coils 25 and 26 are in the cathode circuits of thyratrons 21 and 22 respectively. The electrodes 20 and 27 of the secondary windings of spark coils 25 and 26 are in close proximity to drums 13 and 14, respectively.

In the lower channel, photocell 28 has its cathode connected to the grid of vacuum tube 29 which is connected as a cathode follower. The output of tube 29 is applied to the grid of thyratron 31, and its output taken from the cathode is applied to the grid of thyratron 32. Thyratrons 31 and 32 are shunted by condensers 30 and 35, respectively, and their grids are supplied a negative bias. The primary windings of spark coils 33 and 34 are in the cathode circuits of thyratrons 31 and 32, respectively. The electrodes 36 and 37 of the secondary windings of spark coils 33 and 34 are in close proximity to drums 13 and 14 respectively. Rectifier 38 supplies a positive plate voltage to the photocells, vacuum tubes and thyratrons. A positive voltage from terminal 42 is supplied to terminals 43, 44, 46 and 47 while a positive voltage from terminal 48 is supplied to terminals 49 and 51. Voltage doubler circuit 39 supplies a negative bias to each grid of the four thyratrons. A negative bias from terminal 52 is supplied to terminals 53, 54, 55 and 56. The heaters for all tubes are supplied from a take-off 41 of the same transformer which supplies the voltage doubler. For purposes of clarity, the heaters are not shown in the circuit diagram. Utilizing a 110 volt, 60 cycle source, suitable plate voltages would be 60 volts for the photocells and 300 volts for all other tubes, and a negative bias of 15–17 volts for the grids of the thyratrons. It is not intended, however, to limit the system to any specific voltages, and the device would be operable at various other voltages.

In a preferred modification of the invention, a single thyratron and a single spark coil are utilized in each of the two channels instead of two thyratrons and two spark coils as described above. In such a modification, each spark coil is wound so as to provide two outputs, one electrode being in close proximity to drum 13 and the second electrode being in close proximity to drum 14. With such a spark coil in each channel, the need for thyratrons 22 and 32 is eliminated.

Figure 2:
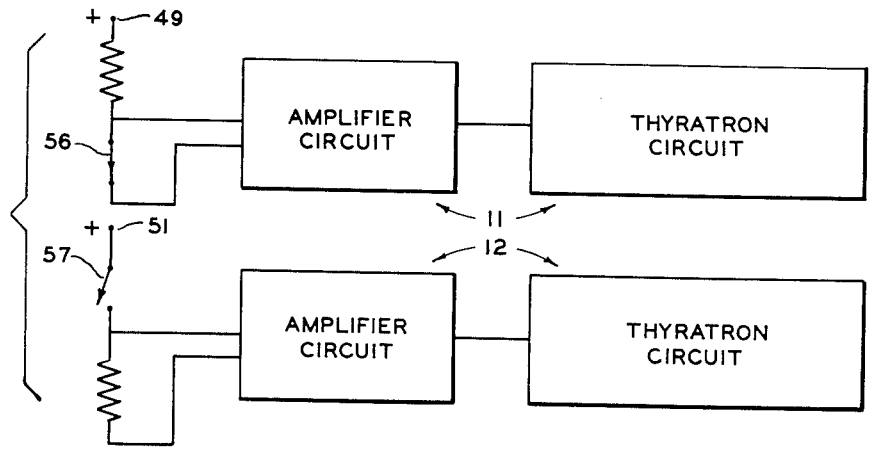
Figure 2 is a circuit diagram, illustrating another form of the invention.

In another preferred modification of the invention as shown by Figure 2, switches 56 and 57 are substituted for photocells 16 and 28 of Figure 1. As shown, switch 56 is normally closed while switch 57 is normally open.

Figure 3A:
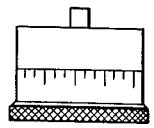
Figures 3A and 3B show the drums with movable scales mounted adjacent thereto.
Figure 3B:
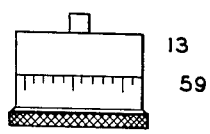

In still another preferred modification of the invention as indicated by Figures 3A and 3B, a cylindrical scale of the same diameter as the drums is positioned next to each of drums 13 and 14. The scales 58 and 59 are mounted on the same shaft as their respective drum, and can be rotated relative to the drum. The scales are calibrated in increments of time so that when properly aligned with the marks on the spark-sensitive paper the time interval being measured can be read directly from the scale.

In the operation of the above described interval timer, when light is shown into photocell 16, it is made conductive. Upon interruption of the light which impinges upon 16, an electrical pulse is provided which is applied to the grid of vacuum tube 17. This pulse is amplified by vacuum tubes 17, 18 and 19, and a positive pulse is applied to the grid of thyratron 21, causing it to become conductive. The charge on condenser 23 in the plate circuit of thyratron 21 passes through the primary winding of spark coil 25 in the cathode circuit. This discharge of condenser 23 causes the secondary winding of spark coil 25 to spark across a small gap between electrode 20 and rotating drum 13, which is covered with spark-sensitive paper, thus giving a clear indication of the position of the drum at the time of the pulse. A sudden rise of cathode voltage of thyratron 21 when it conducts, causes thyratron 22 to become conductive. The charge on condenser 24 in the plate circuit of thyratron 22 passes through the primary winding of spark coil 26 in the cathode circuit. This discharge of condenser 24 causes the secondary winding of spark coil 26 to spark across a small gap between electrode 27 and drum 14, which is also covered with a spark-sensitive paper. When the condensers are discharged as indicated, thyratrons 21 and 22 are extinguished or cease to conduct. Drums 13 and 14 are rotating at known, constant speeds, drum 13 being rotated at a predetermined greater rate than drum 14. Because of the difference in rates of rotation of the two drums, drum 14 will give the coarse time interval reading while drum 13 will furnish the vernier reading. The two points marked simultaneously on the drums as indicated above will correspond in time to the beginning of the interval to be measured.

When a light appears at some later time and impinges upon photocell 28, a pulse is produced which is applied to the grid of vacuum tube 29. This pulse is amplified and is applied to the grid of thyratron 31, causing it to become conductive. The charge on condenser 30 in the plate circuit of thyratron 31 passes through the primary winding of spark coil 33 in its cathode circuit. This discharge of condenser 30 causes the secondary winding of spark coil 33 to spark across a small gap between electrode 36 and rotating drum 13, making a mark on the spark-sensitive paper. A sudden rise of cathode voltage of thyratron 31 causes thyratron 32 to become conductive. The charge on condenser 35 in the plate circuit of thyratron 32 passes through the primary winding of spark coil 34 in the cathode circuit. This discharge of condenser 35 causes the secondary winding of spark coil 34 to spark across a small gap between electrode 37 and drum 14. When the condensers are discharged as indicated, thyratrons 31 and 32 are extinguished. These two points marked on the drums indicate the position of the drums at the time the pulse is produced by photocell 28, and will correspond in time to the end of the interval to be measured.

In the description of operation of the interval timer, photocells have been employed as the means for providing the pulses which indicate the beginning and end of the interval to be measured. It is not intended, however, to confine this invention to the use of photocells. Referring to Figure 2, the employment of switches 56 and 57 in place of photocells 16 and 28 is illustrated. In this modification of the invention, a pulse is produced in the upper channel by opening switch 56 while a pulse is produced in the lower channel by closing switch 57. And it is to be understood that other types of triggering devices such as pressure devcies and inductive devices can be similarly utilized to carry out this invention.

Figure 4A:
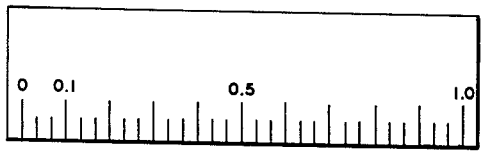
Figures 4A, 4B, 4C and 4D represent scales, which may be used in the measurements, and spark sensitive paper removed from the drums.
Figure 4B:
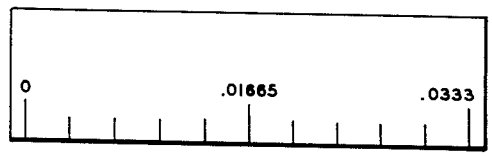
Figure 4C:
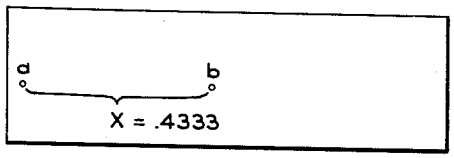
Figure 4D:
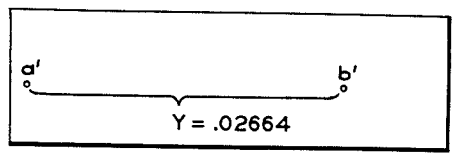

In a typical utilization of the invention, employing synchronous motors, the fast drum was rotated at 1800 R. P. M.'s while the slow drum was rotated at 60 R. P. M's. Under these conditions of operation, the fast drum makes one revolution every 33.3 milliseconds while the slow drum makes one revolution every second or every 1000 milliseconds. Where the time interval to be measured is greater than 1 second, it is possible to count the number of revolutions of the slow moving drum. The fast moving drum then provides a measure of the time in addition to the time or revolutions made by the slow moving drum. The manner of determining the time interval when it is less than one second will be better understood by referring to Figures 4A, 4B, 4C and 4D. The same method is used when the time interval is greater than one second to compute the increment in addition to the whole second. In Figures 4A and 4B two calibrated scales are shown, one to be used with the slow moving drum and the other with the fast moving drum. There are shown also as Figures 4C and 4D two strips of the spark-sensitive paper, which are used to cover the drums. The scales are of the same length as these strips of paper. On the strips, points $a$ and $a'$ represent the marks made on the paper by the sparking process previously described, and indicate the beginning of the time interval to be measured. Similarly, points $b$ and $b'$ indicate the end of the time interval to be measured. The scale for the slow drum is laid alongside points $a$ and $b$, and a reading X is taken at the appropriate lower graduation on the scale. The scale for the fast drum is laid alongside points $a'$ and $b'$, and a reading Y is taken, the distance between graduations being estimated. The two readings X and Y are then added together to obtain the total time interval. In Figures 4C and 4D, X is shown as being .4333, and Y as being .02664, their total being .45994 second or 459.94 milliseconds. In making the actual measurements and employing a flexible scale, it is to be understood that it would not be necessary to remove the spark-sensitive paper from the drums In a preferred modification of this invention as indicated in Figures 3A and 3B, it is contemplated having cylindrical scales, calibrated similarly to those shown in Figures 4A and 4B, mounted next to and rotatable relative to the drums By merely rotating scales 58 and 59 so as to align their zero graduations with the appropriate marks on the spark-sensitive paper, a direct reading of the time interval can be obtained Although I have described my invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

I claim:

1. A time interval measuring device comprising in combination two rotatable drums; means for rotating said drums at known and constant but different rates of speed; means for marking simultaneously on each of said drums the beginning of the interval to be measured; and means for marking simultaneously on each of said drums the end of the interval to be measured.

2. A time interval measuring device comprising in combination two drums rotatable at different known rates of speed by synchronous motors; means for providing a first pulse in a first electrical channel to indicate the beginning of the time interval to be measured; means for recording said first pulse simultaneously on each of said drums; means for providing a second pulse in a second electrical channel to indicate the end of the time interval to be measured; and means for recording said second pulse simultaneously on each of said drums.

3. A time interval measuring device comprising in combination two rotatable drums covered with paper; means for rotating said drums at known, constant and different rates of speed; means for providing a first electric signal in a first electrical channel which comprises an amplifying means, a thyratron tube and a spark coil; means for recording said first signal on the paper on each of said drums; means for providing a second electric signal in a second electrical channel which comprises an amplifying means, a thyratron tube and a spark coil; and means for recording said second signal simultaneously on the paper on each of said drums.

4. A time interval measuring device which comprises in combination two rotatable drums covered with spark-sensitive paper; means for rotating said drums at different, known, constant rates of speed; a first photocell with its anode connected to the grid of a first vacuum tube, said first vacuum tube being connected as a cathode follower; a second vacuum tube connected as a cathode follower and feeding a third vacuum tube, said third vacuum tube being connected as a grounded grid amplifier; a first thyratron with its grid connected to the anode of said third vacuum tube, said first thyratron being shunted by a condenser and having its grid supplied a negative bias; a first spark coil with its primary windings in the cathode circuit of said first thyratron tube and with its secondary windings providing two outputs and having an electrode positioned next to each of said drums; a second photocell with its cathode connected to the grid of a fourth vacuum tube; a second thyratron with its grid connected to the cathode of said fourth vacuum tube, said second thyratron being shunted by a condenser and having its grid supplied a negative bias; a second spark coil with its primary windings in the cathode circuit of said second thyratron tube and with its secondary windings providing two outputs and having an electrode positioned next to each of said drums.

5. The device of claim 4 wherein the plates of all tubes are connected to a positive power supply, the grids of all thyratrons are connected to a voltage doubler providing a negative bias and the heaters of all tubes are connected to a take-off of the secondary of the same transformer which supplies said voltage doubler.

6. A time interval measuring device which comprises in combination two drums rotatable at different known speeds by synchronous motors, said drums being covered by a spark-sensitive paper; a first photocell whose anode is connected to the grid of a first vacuum tube, said tube being connected as a cathode follower; a second vacuum tube having a gain control and connected as a cathode follower to said first tube and feeding a third vacuum tube connected as a grounded grid amplifier; a first thyratron with its grid connected to the anode of said third tube and having its output supplied to the grid of a second thyratron, said first and second thyratrons being shunted by condensers and having their grids supplied a negative bias; a first spark coil having its primary windings in the cathode circuit of said first thyratron and the electrode of its secondary windings positioned next to one of said drums; a second spark coil having its primary windings in the cathode circuit of said second thyratron and the electrode of its secondary windings positioned next to the second of said drums; a second photocell with its cathode connected to the grid of a fourth vacuum tube; a third thyratron with its grid connected to the cathode of said fourth tube and having its output supplied to the grid of a fourth thyratron, said third and fourth thyratrons being shunted by condensers and having their grids supplied a negative bias; a third spark coil having its primary windings in the cathode circuit of said third thyratron and the electrode of its secondary windings positioned next to one of said drums; a fourth spark coil having its primary windings in the cathode circuit of said fourth thyratron and the electrode of its secondary windings positioned next to one of said drums.

7. The device of claim 6 wherein the plates of all tubes are connected to a positive power supply, the grids of all thyratrons are connected to a voltage doubler, and the heaters of all tubes are connected to a take-off of the secondary of the same transformer which supplies said voltage doubler.

8. A time interval measuring device comprising two rotatable drums covered with spark-sensitive paper; means for rotating said drums at known and different constant rates of speed; means for providing a first electrical pulse in a first electrical channel, first means for amplifying said first pulse, a first thyratron having its grid circuit supplied with the output of said first means for amplifying, said first thyratron being shunted by a condenser and having a negative bias applied to its grid, and a first spark coil having a primary in the anode-cathode circuit of said thyratron and a secondary with an electrode positioned next to each of said drums; and means for providing a second electrical pulse in a second electrical channel, second means for amplifying said second pulse, a second thyratron having its grid circuit supplied with the output of said second means for amplifying, said second thyratron being shunted by a condenser and having a negative bias applied to its grid, and a second spark coil having a primary in the anode-cathode circuit of said second thyratron and a secondary with an electrode positioned next to each of said drums.

9. The device of claim 8 wherein the means for providing said pulses are photocells.

10. The device of claim 8 wherein the means for providing said pulses are switches.

11. The device of claim 8 wherein a cylindrical scale is positioned next to each of said drums, said scales being rotatable in relation to said drums and having time graduations thereon.

References Cited in the file of this patent

UNITED STATES PATENTS

| 916,572 | Mettegang | Mar. 30, 1909 |
| 943,718 | Betzler | Mar. 16, 1949 |
| 1,984,995 | Rumpel | Dec. 18, 1934 |
| 2,169,818 | Scott | Aug. 15, 1939 |
| 2,450,341 | Hershberger | Sept. 28, 1948 |
| 2,474,842 | Hayes | July 5, 1949 |
| 2,622,678 | Peterson | Dec. 23, 1952 |